United States Patent [19]

Klein

[11] 4,422,472

[45] Dec. 27, 1983

[54] PUMP BASIN VALVE AND SLIP JOINT

[75] Inventor: L. E. Klein, Mansfield, Ohio

[73] Assignee: Harvey Hubbell Incorporated, Orange, Conn.

[21] Appl. No.: 316,148

[22] Filed: Oct. 29, 1981

[51] Int. Cl.³ .............................................. F16L 37/00
[52] U.S. Cl. .......................... 137/614.06; 137/614.2; 251/148; 251/149.9; 285/87; 285/325; 285/326
[58] Field of Search ...................... 137/637.05, 614.06, 137/614.2; 251/149.9, 148; 285/325, 326, 82, 87, 88

[56] References Cited

U.S. PATENT DOCUMENTS

| | | | |
|---|---|---|---|
| 83,118 | 10/1868 | Yeaton | 251/149.9 |
| 745,534 | 5/1933 | Bernard et al. | |
| 2,918,972 | 12/1959 | Tubbs | 285/325 |
| 2,958,547 | 11/1960 | Batts et al. | 285/26 |
| 3,018,925 | 1/1962 | Englesson | 222/180 |
| 3,330,299 | 7/1967 | Slawinski et al. | 137/614 |
| 3,366,403 | 1/1968 | Nelson | 285/87 |
| 3,511,252 | 5/1970 | Kennedy | 134/145 |
| 3,592,564 | 7/1971 | Connery | 417/360 |
| 3,741,243 | 6/1973 | Deibler et al. | 137/528 |
| 4,037,654 | 7/1977 | Lien | 285/325 |
| 4,043,707 | 8/1977 | Heumann et al. | 285/325 |
| 4,049,234 | 9/1977 | Spisak | 251/149.9 |
| 4,103,712 | 8/1978 | Fletcher et al. | 285/326 |

*Primary Examiner*—A. Michael Chambers
*Attorney, Agent, or Firm*—Jerry M. Presson; Walter C. Farley

[57] ABSTRACT

A detachable valve and slip joint structure is provided to permit removal of a basin pump. The structure includes an elbow joint attachable to the pump and having a lifting eye and a check valve to prevent backflow into the pump. The horizontal outlet from the elbow has a downwardly opening U-shaped flange and a pressure seal to engage a lip on a tubular outlet pipe which contains a 90° plug or ball valve. The stem of the 90° valve is attachable to a handle and carries a locking tab movable between stops. The tab engages the elbow when the 90° valve is in its open position, preventing disengagement of the flange and lip slip joint until the valve is rotated to its closed position.

4 Claims, 3 Drawing Figures

PUMP BASIN VALVE AND SLIP JOINT

This invention relates to an improved valve and slip joint structure for use with a basin pump.

BACKGROUND OF THE INVENTION

Because of changes in local codes and because of the increased expense of installing gravity sewer systems, and also for reasons of ecology, it has become increasingly desirable to employ pressurized sewage handling systems. In many such systems it is desirable to use a basin in which a pump is installed along with its associated electrical and plumbing hardware. The pump can be either a grinder or an effluent type, depending on system requirements.

As will be recognized, provision must be made for removal of the pump for repair or servicing. Thus, it is customary to provide some sort of rather easily disengagable coupling between the pump and the outlet line. It is also necessary to provide some sort of manual shut-off valve which can be closed to prevent back flow when the pump is removed, and a check valve to prevent back flow when the pump is connected but not operating.

Examples of various devices proposed for use in these areas are found in the following patents.

U.S. Pat. Nos. 2,958,547 Batts et al; 3,018,925 Englesson; 3,330,299 Slawinski et al; 3,511,252 Kennedy; 3,592,564 Connery; 3,741,243 Deibler et al; 4,049,234 Spisak; French No. 745,534;

BRIEF DESCRIPTION OF THE INVENTION

An object of the present invention is to provide an improved apparatus enabling quick connection and disconnection of a pump to and from a pressurized sewage conduit.

A further object is to provide a self-contained coupling having all of the necessary seals and valves to permit such connection and disconnection.

Yet another object is to provide such a coupling having an improved safety lock preventing disconnection unless a valve is in the proper position.

Briefly described, the invention includes a valve and coupling apparatus for releasably interconnecting the outlet of a pump and a conduit comprising a first valve assembly comprising a first housing, means defining a passage through said first housing, at least one end of said passage terminating in an opening having a generally horizontal axis, the other end of said housing being connectable to the pump outlet, a check valve in said housing, and a generally U-shaped flange on said housing opening downwardly and partially encompassing said opening, said flange having a continuous recess extending along the inwardly facing surface thereof, a second valve assembly comprising means defining a flow path therethrough, at least one end of said flow path terminating in an opening having a generally horizontal axis and the other end thereof being connectable to the conduit, a radially outwardly extending, generally circular flange surrounding said opening, said circular flange being shaped and dimensioned to be received in said recess in said U-shapd flange downwardly over said circular flange, thereby coupling said first and second housings together with said at least one openings aligned, a valve element in said flow path, said valve element being rotatable through an angle of about 90° between positions in which said flow path is opened and closed, a stem attached to and rotatable with said valve element and extending upwardly through said second housing, the exposed end thereof being connectable to a handle, and a locking tab coupled to said stem and having an end portion extending radially away from said stem, said tab being oriented toward said first housing when said valve element is in the open position, and said first housing further comprises a projection fixedly attached to said first housing and extending toward said stem when said first and second housings are coupled together and protruding between said second housing and said tab when said valve element is in it open position, thereby preventing uncoupling of said housings until said valve element is rotated to its closed position.

In order that the manner in which the foregoing and other objects are attained in accordance with the invention can be understood in detail, particularly advantageous embodiments thereof will be described with reference to the accompanying drawings, which form a part of this specification and wherein.

Figure 1:
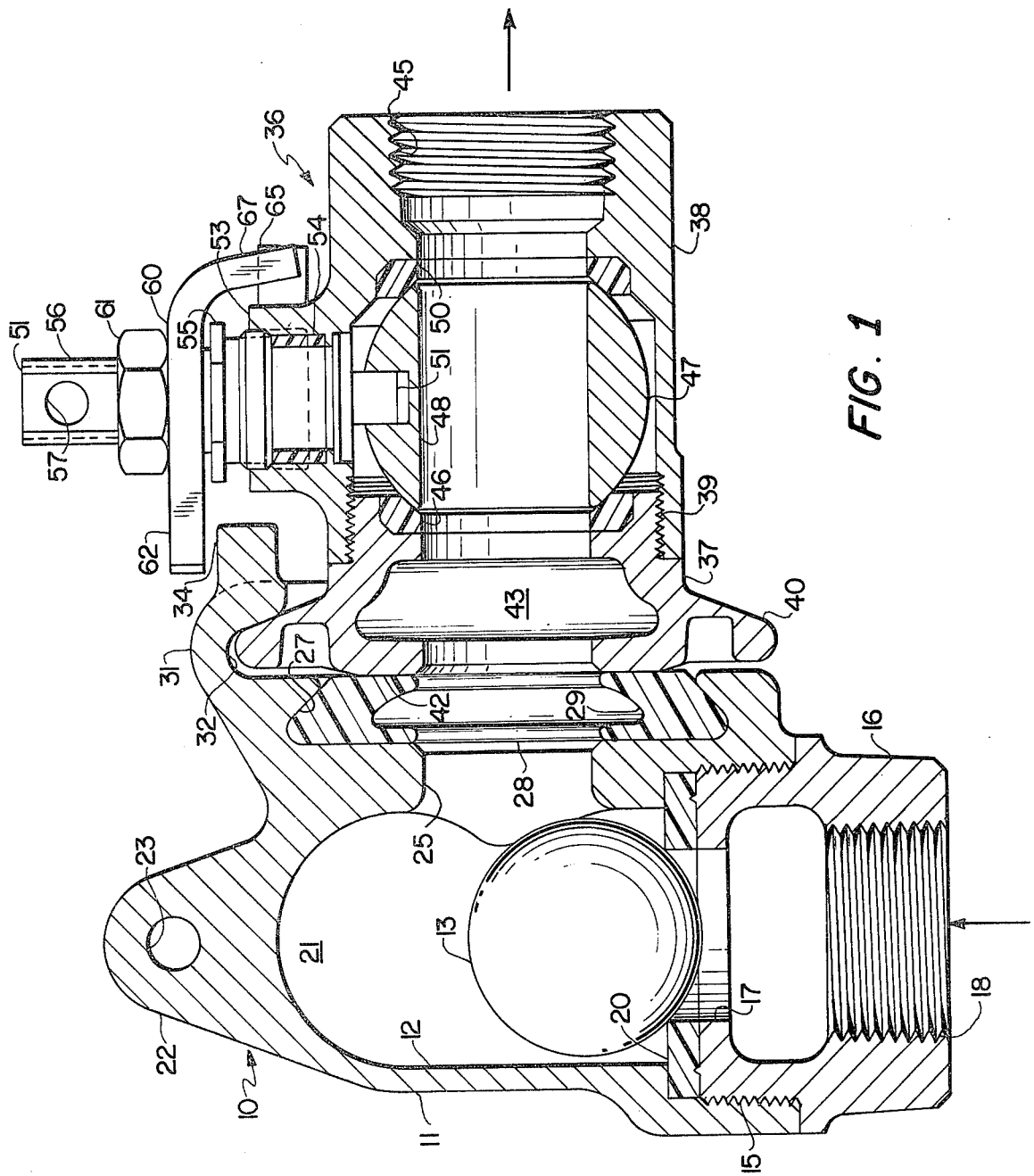
FIG. 1 is a side elevation, in section, of a coupling apparatus in accordance with the invention.
Figure 2:
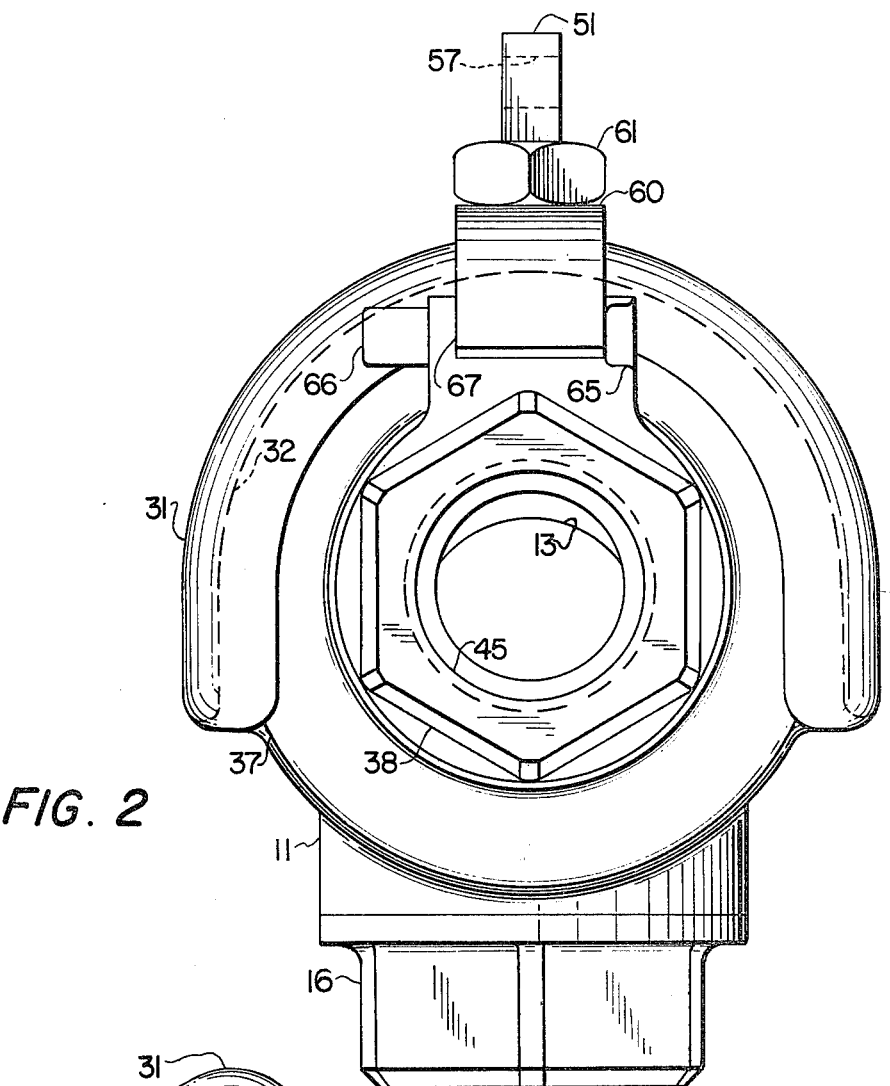
FIG. 2 is an end elevation of the structure of FIG. 1.
Figure 3:
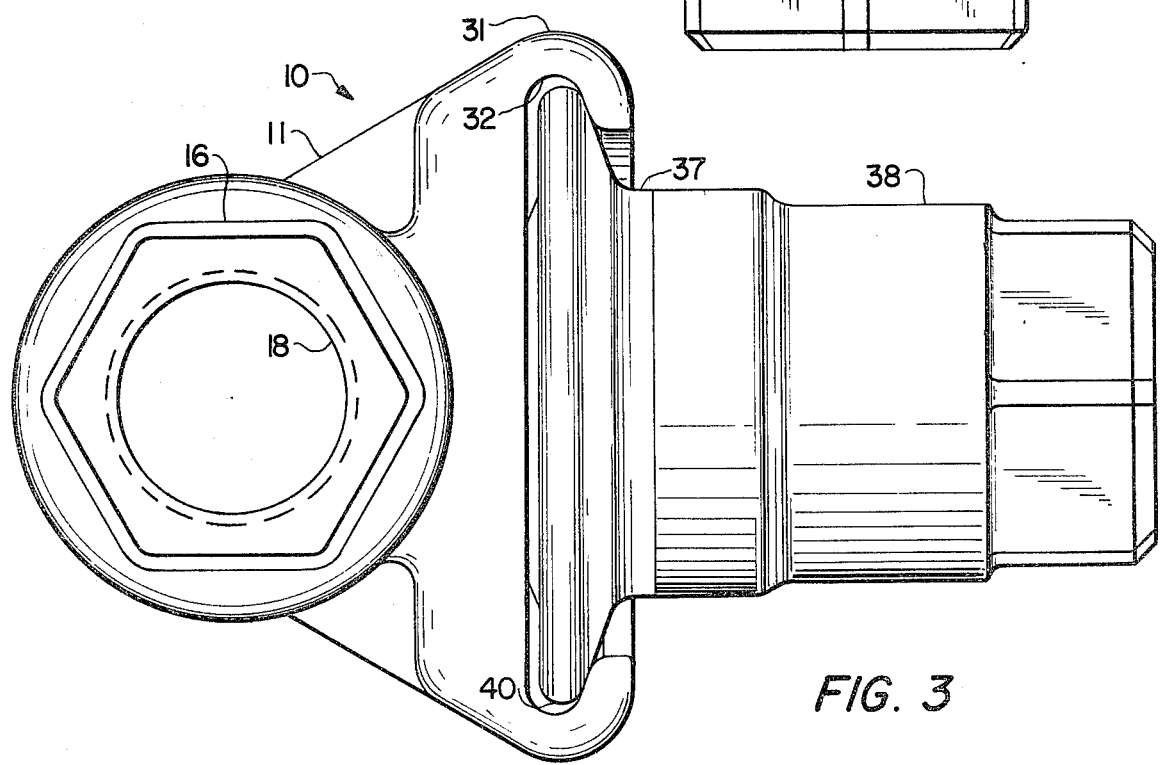
FIG. 3 is a bottom plan view of the structure of FIGS. 1 and 2.

Referring now to the drawings in detail, and jointly to FIGS. 1, 2 and 3, it will be seen that the apparatus of the present invention includes a first housing indicated generally at 10 comprising an upper portion 11 having a cavity 12 therein which receives a ball 13. The lower end of housing portion 11 has an internally threaded opening 15 into which a coupling member 16 is threaded. Coupling member 16 has a passage 17 therethrough, the lower portion of the passage being threaded at 18 so that it can be attached to the outlet of a pump. Thus, fluid flow will be upwardly, as indicated by the arrow.

Passage 17 is smaller in diameter than cavity 12, and the upper surface of fitting 16 is provided with a washer 20 which is preferably made of an elastomeric material such as neoprene, the central opening through washer 20 being significantly smaller than the outer diameter of ball 13 so that it forms a resilient valve seat with which the ball can cooperate. Thus, ball 13 and seat 20 form a check valve, permitting fluid flow through housing 10 when the flow is in the direction of the arrow and preventing flow of fluid in the reverse direction. As will be observed cavity 12 has an upper portion 21 shaped and dimensioned to receive the ball so that the ball is substantially removed from the fluid flow path when pressure is in the allowable flow direction.

At the upper end of housing portion 11 is a protruding portion 22 having an opening 23 therein to receive a hook or the like for the purpose of lifting first housing 10 and the pump connected to portion 16 from the basin in which the pump and the apparatus illustrated in FIGS. 1–3 is normally disposed.

Housing portion 11 also includes a passage 25 leading from cavity 12 and terminating at an opening, portion 25 and the opening having an axis which, in normal use, is substantially horizontal. At the opening is a radially outwardly extending annular recess 27 which receives an elastomeric hydrostatic seal 28 which is generally circular in shape and which, in radial section, includes an internal recess 29 defining two legs which are acted upon by fluid pressure in the central passage thereof, tending to force the legs away from each other.

Outwardly of recess 27 is a flange 31 which, as best seen in FIG. 2, is generally U-shaped, opening downwardly. The upper portion of the U-shaped flange is circular and extends through approximately 180° of arc. Tangent to that circular portion are two legs which extend essentially straight down. Within flange 31 is a recess 32 which extends continuously along the inwardly facing surface of the flange, the recess therefore also being U-shaped and opening downwardly and inwardly.

Attached to flange 31 is a projection 34 which protrudes in a direction which is substantially parallel with the central axis of passage 25.

Coupled to valve assembly 10 is a second valve assembly indicated generally at 36 which includes housing portions 37 and 38, housing 37 being externally threaded to mate with an internally threaded portion 39 of housing 38. Portion 37 is provided with a radially outwardly protruding generally circular flange 40 which is shaped and dimensioned to be received in recess 32 of flange 31 connected to housing portion 11. As will be recognized in FIGS. 2 and 3, flange 40 is insertable into the U-shaped recess 32 in flange 31 when valve assembly 10 is lowered relative to valve assembly 36 with the plane containing flange 40 being aligned with the plane containing recess 32. Alternatively, valve assembly 36 could be moved upwardly relative to assembly 10 so that flange 40 is slipped into the recess; but in the normal installation, valve assembly 36 would be fixed in its location and assembly 10 would be movable.

As seen in FIG. 1, housing portion 37 has an axially facing surface 42 which, when the two valve assemblies are coupled together, abuts seal 28 and, as previously indicated, hydrostatic pressure within the seal causes one leg of the seal to be pressed against that face. A passage 43 provides a flow path through housings 37 and 38, this path terminating at the other end of the valve assembly which is internally threaded at 45 to receive the connection to a conduit, not shown, to receive material pumped by the pump connected to portion 16. The downstream end of housing portion 38 is provided with a recess to receive a ball valve seat 46 which is generally annular and which has a chamfered surface to mate with a valve element 47. In the embodiment shown, valve element 47 is a ball valve. However, as will be recognized by those skilled in the art, this element could also be a plug valve or the like. The valve element has a central passage 48 which, when aligned with flow path 43, permits flow of fluids through the valve assembly. When rotated through an angle of substantially 90°, flow is obstructed. Housing portion 38 also includes an annular recess which receives a similar valve seat 50 engaging the other side of the ball valve element. Preferably, valve seats 46 and 50 are made of a material such polytetrafluoroethylene (TEFLON) to provide suitable sealing and to permit easy rotation of the valve element.

A stem structure 51 is connected to valve element 47 and extends upwardly through an internally threaded boss 53 at the upper surface of housing portion 38, the stem being sealed against fluid leakage by a stem packing 54 which is retained in position by a conventional packing gland 55. The upper end of stem 51 can be externally threaded as illustrated at 56 and can also have an opening 57 therethrough so that a handle can be coupled to the stem for rotating it and valve element 47.

A non-circular portion of the stem receives a locking tab 60 which is held on the stem by a nut 61. Tab 60 has an end portion 62 which extends in a direction parallel with opening 48 in valve element 47. Because locking tab 60 is provided with a non-circular opening matching the shape of the non-circular portion of stem 51, the locking tab rotates with the stem and always remains aligned with, or in a predetermined direction relative to, passage 48. In the position shown, in which the valve element is in its open position, the end 62 of locking tab 60 lies over projection 34 connected to housing portion 11. Thus, when the valve is open, upward movement of valve assembly 10, and of the pump connected thereto, is prevented by the locking tab. However, rotation of the stem and valve element to its closed position rotates the locking tab so that portion 62 no longer conflicts with projection 34, permitting the pump and valve assembly 10 to be vertically uncoupled from valve assembly 36 so that the pump can be removed from the basin for servicing.

Housing 38 is also provided with projections 65 and 66 which form stop members for the locking tab. The locking tab has a downwardly protruding portion 67 lying between the vertical surfaces of projections 65 and 66 which are disposed so that the locking tab can swing through an angle of approximately 90°, the projections being arranged so that movement of the stem and valve element from the open to the closed position is in a clockwise direction as viewed from above.

As best seen in FIGS. 2 and 3, the end of portion 16 surrounding threaded portion 18 and the end housing portion 38 surrounding threaded portion 45 are hexagonally shaped to permit the application of a tightening tool.

As previously indicated, the apparatus shown in FIGS. 1 and 3 when used in conjunction with a pressurized sewage system is installed with threaded portion 45 being connected to a discharge conduit connected to the pressurized sewage system. Thus, the conduit and valve assembly 36 are fixed in position in a basin from which material is to be discharged. A pump is coupled, through suitable fittings, to threaded portion 18 of valve assembly 10, and the pump with its connected valve assembly are lowered into the basin so that flange 40 is received in recess 32. This would be accomplished, necessarily, with valve element 47 in its closed position so that projection 34 will not be interfered with by the protruding end portion 62 of locking tab 60. During installation, the pump would, of course, be de-energized. After connection, valve element 47 can be rotated to its open position, as illustrated, by couterclockwise rotation of stem 51, moving tab 60 to the position illustrated in FIGS. 1 and 2. Thereafter, the pump and valve assembly 10 can not be removed until the valve is again closed. As soon as the pump is energized and provides sufficient fluid pressure input through passage 17, ball 13 of the check valve will be moved upwardly into cavity 21, permitting fluid flow through the two valve assemblies and into the conduit. As previously suggested, the valve element 37 can be any suitable style of quarter-turn valve.

While one advantageous embodiment has been chosen to illustrate the invention it will be understood by those skilled in the art that various changes and modifications can be made therein without departing from the scope of the invention as defined in the appended claims.

What is claimed is:

1. A valve and coupling apparatus for releasably interconnecting the outlet of pump and a conduit comprising a first valve assembly comprising
  a first housing;
  means defining a passage through said first housing, at least one end of said passage terminating in an opening having a generally horizontal axis, the other end of said housing being connectable to the pump outlet,
  a check valve in said housing, and
  a generally U-shaped flange on said housing opening downwardly and partially encompassing said opening, said flange having a continuous recess extending along the inwardly facing surface thereof;
a second valve assembly comprising
  means defining a flow path therethrough, at least one end of said flow path terminating in an opening having a generally horizontal axis and the other end thereof being connectable to the conduit,
  a radially outwardly extending, generally circular flange surrounding said opening, said circular flange being shaped and dimensioned to be received in said recess in said U-shaped flange downwardly over said circular flange, thereby coupling said first and second housings together with said at least one openings aligned,
  a valve element in said flow path, said valve element being rotatable through an angle of about 90° between positions in which said flow path is opened and closed,
  a stem attached to and rotatable with said valve element and extending upwardly through said second housing, the exposed end thereof being connectable to a handle, and
  a locking tab coupled to said stem and having an end portion extending radially away from said stem, said tab being oriented toward said first housing when said valve element is in the open position; and
said first housing further comprises
  a projection fixedly attached to said first housing and extending toward said stem when said first and second housings are coupled together and protruding between said second housing and said tab when said valve element is in its open position, thereby preventing uncoupling of said housings until said valve element is rotated to its closed position.

2. An apparatus according to claim 1 wherein said second housing further includes
means defining stop surfaces angularly separated by about 90°; and
said locking tab further includes means extending between said stop surfaces for limiting the angular movement of said locking tab, said stem and said valve element.

3. An apparatus according to claim 1 wherein said first housing further includes
an annular recess surrounding said at least one opening inwardly of said U-shaped flange; and
a hydrostatic seal member in said recess,
  said seal member having a face exposed for contact with said second housing when said housings are coupled together.

4. An apparatus according to claim 3 wherein said seal member is generally U-shaped in radial section.

* * * * *